(12) United States Patent
Gaudreau et al.

(10) Patent No.: US 10,514,173 B2
(45) Date of Patent: Dec. 24, 2019

(54) ANIMAL HOUSE ENVIRONMENT CONTROL SYSTEM WITH MULTIPLE LEVELS OF REDUNDANCY

(71) Applicant: The GSI Group, LLC, Assumption, IL (US)

(72) Inventors: Yvon Gaudreau, St-Hubert (CA);
Benoit R. Laberge, St-Hubert (CA);
Adam Weiss, Forsyth, IL (US); Nicolas Bégin, Saint-Jean sur Richelieu (CA)

(73) Assignee: The GSI Group, LLC, Assumption, IL (US)

( * ) Notice: Subject to any disclaimer, the term of this patent is extended or adjusted under 35 U.S.C. 154(b) by 150 days.

(21) Appl. No.: 15/580,067

(22) PCT Filed: May 12, 2016

(86) PCT No.: PCT/US2016/032064
§ 371 (c)(1),
(2) Date: Dec. 6, 2017

(87) PCT Pub. No.: WO2016/186952
PCT Pub. Date: Nov. 24, 2016

(65) Prior Publication Data
US 2018/0149374 A1  May 31, 2018

Related U.S. Application Data

(60) Provisional application No. 62/163,182, filed on May 18, 2015.

(51) Int. Cl.
*F24D 19/10* (2006.01)
*A01K 1/00* (2006.01)
(Continued)

(52) U.S. Cl.
CPC ........ *F24D 19/1096* (2013.01); *A01K 1/0047* (2013.01); *A01K 1/0052* (2013.01);
(Continued)

(58) Field of Classification Search
CPC ......... F24D 19/1096; F24D 2220/0207; F24D 2220/0214; F24D 2220/042;
(Continued)

(56) References Cited

U.S. PATENT DOCUMENTS

| | | |
|---|---|---|
| 5,193,483 A | 3/1993 | Crider et al. |
| 6,129,286 A | 9/2000 | Vostermans |

(Continued)

FOREIGN PATENT DOCUMENTS

| | | |
|---|---|---|
| DE | 3917482 A1 | 12/1990 |
| DE | 20 2012 008814 U1 | 1/2014 |

(Continued)

OTHER PUBLICATIONS

UK Intellectual Property Office, International Search Report for related UK Application No. GB1509498.0, dated Nov. 9, 2015.

(Continued)

*Primary Examiner* — Charles R Kasenge

(57) ABSTRACT

A climate control system is operated by receiving climate information from climate control input devices at one or more plugin modules. The climate information is communicated from the plugin modules to a main control unit, which determines operating instructions for climate output devices and air inlets. When it is detected that the main control unit is not operational, the control system switches to a standby control unit if so equipped. The climate information is then communicated from the plugin modules to the standby control unit. The standby control unit determines operating instructions for the climate output devices and air inlets based on the climate information. When it is (Continued)

detected that the standby control unit is also not operational, the plugin modules switch to an autonomous mode such that operating instructions for the climate output devices and air inlets are determined by the plugin modules.

4 Claims, 1 Drawing Sheet

(51) Int. Cl.

| | | |
|---|---|---|
| *F24D 13/00* | (2006.01) | |
| *G05B 19/042* | (2006.01) | |
| *F24F 11/30* | (2018.01) | |
| *F24F 11/70* | (2018.01) | |
| *F24F 110/10* | (2018.01) | |
| *F24F 110/40* | (2018.01) | |
| *F24F 11/32* | (2018.01) | |
| *F24F 11/54* | (2018.01) | |

(52) U.S. Cl.
CPC ............ *A01K 1/0076* (2013.01); *F24D 13/00* (2013.01); *F24F 11/30* (2018.01); *F24F 11/70* (2018.01); *G05B 19/0426* (2013.01); *F24D 2200/08* (2013.01); *F24D 2200/32* (2013.01); *F24D 2220/0207* (2013.01); *F24D 2220/0214* (2013.01); *F24D 2220/042* (2013.01); *F24F 11/32* (2018.01); *F24F 11/54* (2018.01); *F24F 2110/10* (2018.01); *F24F 2110/40* (2018.01); *G05B 2219/2614* (2013.01)

(58) Field of Classification Search
CPC .. F24D 2200/32; F24D 13/00; F24D 2200/08; A01K 1/0076; A01K 1/0052; A01K 1/0047; G05B 19/0426; G05B 2219/2614; F24F 11/54; F24F 11/32; F24F 2110/40; F24F 2110/10; F24F 11/30; F24F 11/70
See application file for complete search history.

(56) References Cited

U.S. PATENT DOCUMENTS

| | | | | |
|---|---|---|---|---|
| 7,992,794 | B2 * | 8/2011 | Leen | G05D 23/1931 236/51 |
| 8,740,101 | B2 * | 6/2014 | Leen | G05D 23/1931 236/51 |
| 2010/0006660 | A1 * | 1/2010 | Leen | G05D 23/1931 236/51 |
| 2011/0137467 | A1 * | 6/2011 | Leen | G05D 23/1931 700/276 |
| 2015/0292764 | A1 * | 10/2015 | Land, III | H04L 67/12 700/278 |

FOREIGN PATENT DOCUMENTS

| | | |
|---|---|---|
| WO | 97/47929 A1 | 12/1997 |
| WO | 2011/149023 A1 | 12/2011 |

OTHER PUBLICATIONS

European Patent Office, International Search Report for International Application No. PCT/ US2016/032064, dated Jul. 27, 2016.

* cited by examiner

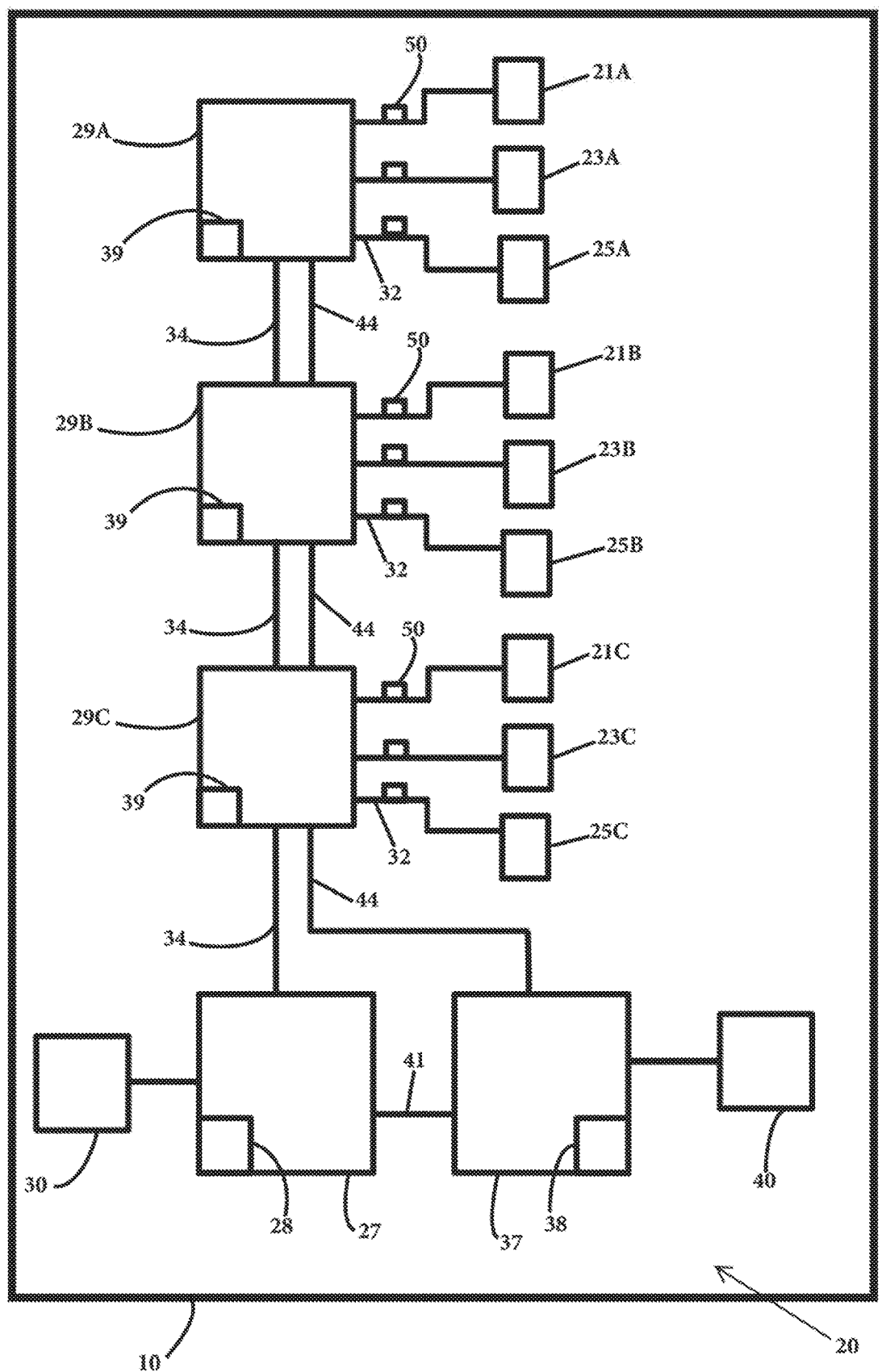

ANIMAL HOUSE ENVIRONMENT CONTROL SYSTEM WITH MULTIPLE LEVELS OF REDUNDANCY

RELATED APPLICATION

Under provisions of 35 U.S.C. § 119(e), Applicant claims the benefit of U.S. Provisional Application No. 62/163,182, entitled Animal House Environment Control System with Multiple Levels of Redundancy and filed May 18, 2015.

BACKGROUND OF THE INVENTION

Field of Invention

This invention relates to climate control systems for buildings used to house animals, and more particularly to an animal house environment control system with multiple levels of redundancy.

Description of Related Art

In buildings that are used to house animals such as poultry, swine or livestock, it is important to maintain a desired building climate. A well-controlled environment involves monitoring and regulating the temperature, relative humidity and air quality in the building. For example, properly controlled temperatures enable animals to use feed for growth rather than for body heat. A properly heated animal house results in lower feed costs and increased animal productivity. Additionally, control over the level of humidity in the building is necessary because excess humidity contributes to animal discomfort and promotes the growth of harmful air born bacteria that can cause respiration diseases. Having an elevated humidity level in the animal house may also lead to more frequent changes of bedding and litter which increases production costs.

To maintain the proper climate in the animal building, various heaters and ventilation fans are used as necessary to maintain the desired temperature and humidity. It is known to use a control unit to automatically control operation of the heaters and ventilation fans located within the building. Sensing devices, such as temperature sensing devices, are used to provide the necessary information to the control unit to enable such automatic control.

Improper operation of any of the heaters or ventilation fans can lead to undesirable and even dangerous conditions in the animal building. Typically, the control systems for animal buildings have limited backup capability that offers reduced functionality in terms of what the system is capable of when compared to regular operations. Often the backup systems must be separately purchased and then wired in conjunction with the normal relay that is actuated by the control system.

It is the aim of the present invention to provide a more robust climate control system with multiple levels of redundancy.

OVERVIEW OF THE INVENTION

In one embodiment, the invention is directed to a method of operating a climate control system of an animal house. The climate control system is operated by receiving climate information from a plurality of climate control input devices at at least one plugin modules. The climate information is communicated from the plugin modules to a main control unit. The main control unit determines operating instructions for a plurality of climate output devices and air inlets based on the climate information. When it is detected that the main control unit is not operational, the control system switches to a standby control unit if so equipped. The climate information is then communicated from the plugin modules to the standby control unit. The standby control unit determines operating instructions for the climate output devices and air inlets based on the climate information. When it is detected that the standby control unit is also not operational, the plugin modules switch to an autonomous mode such that operating instructions for the climate output devices and air inlets are determined by the plugin modules. When it is determined that the plugin modules are not operational, failsafe relays are used to control operation of the output devices and air inlets.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 is a schematic drawing of a climate control system of the present invention.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Referring to FIG. 1, a schematic of an animal house 10 having a climate control system 20 is shown. The climate control system 20 has a plurality of climate control input devices, such as temperature or static pressure probes, indicated at 21A-C. The sensing devices 21A-C may be located in different portions of the animal house 10 so that climate information, such as temperature and static pressure, may be received for the different portions. Although three input devices 21A-C are shown, it will be understood that this is for purposes of illustrations only, and that additional or fewer input devices may be provided, as required. The climate control system 20 also has a plurality of climate control output devices, such as ventilation fans and/or heaters, indicated at 23A-C mounted in the building 10. Although three heaters and ventilating fans 23A-C are shown, it will be understood that this is for purposes of illustrations only, and that additional or fewer heaters and fans may be provided, as required. Various air inlets such as sidewall inlets, ceiling inlets and or tunnel inlets, indicated at 25A-C, are used by the climate control system 20 to control airflow into the animal house 10. Although three air inlets 25A-C are shown, it will be understood that this is for purposes of illustrations only, and that additional or fewer air inlets may be provided, as required.

The climate control system 20 has a main control unit 27, which incorporates a suitable controller, such as a microprocessor main control unit 28, which receives input information from the input devices 21A-C and regulates the operation of the ventilating fans and heaters 23A-C and the air inlets 25A-C by way of plugin modules 29A-C. In the illustrated embodiment, different portions of the animal house 10 may be controlled by different plugin module 29A-C. Each input device 21A-C, output device 23A-C and air inlet 25A-C is connected with its respective plugin module 29A-C with a suitable plugin communication connection 32. The plugin communication connections 32 may be any wired or wireless connection understood by one skilled in the art capable of enabling communication between the plugin modules 29A-C and input devices 21A-C, output devices 23A-C and air inlets 25A-C. The plugin modules 29A-C may be any suitable input/output card or relay card understood by one skilled in the art.

Each plugin module 29A-C is connected with the main control unit 27 with a suitable main control unit communication connection 34. The main control unit communication connections 34 may be any wired or wireless connection understood by one skilled in the art capable of enabling communication between the plugin modules 29A-C and the control unit 27. The main control unit 27 receives its operating power from a suitable main power supply 30. As would be understood by one skilled in the art, the controller 28 in main control unit 27 is adapted to regulate the operation of the output devices in response to specific data received from the input devices, and in accordance with a program relating to the physical characteristics of the animal house 10 and needs of animals in the house.

According to the invention, the control system 20 comprises redundant communication and power paths. In one embodiment, the climate control system 20 has a standby control unit 37, which incorporates a suitable controller, such as a microprocessor main control unit 38, also capable of operating of the ventilating fans and heaters 23A-C and the air inlets 25A-C by way of plugin modules 29A-C. The dual control units 27 and 37 act in an active/standby fashion. Desirably, the standby control unit 37 receives all program changes and constantly monitors the signals sent over the communication connections. Should any problem occur with the main control unit 27, the standby control unit 37 assumes active status to enable the control system 20 to continue normal operation. In one embodiment, there is a communication protocol between the two control units 27 and 37 such that they arbitrate and one becomes active, the other standby. Then there is a heartbeat message between the control units 27 and 37 over connection 41 to check that both control units 27 and 37 are functioning. When the heartbeat is lost for the main control unit 27, the standby control unit 37 becomes active.

Each plugin module 29A-C is also connected with the standby control unit 37 with a suitable standby controller communication connection 44. The standby controller communication connections 44 may be of the same type as the main control unit communication connections 34 enabling communication between the plugin modules 29A-C and the standby control unit 37. The standby control unit 37 receives its operating power from a suitable standby power supply 40.

In one embodiment, a level of redundancy comes into play when the main control unit 27 (or both control units 27, 37 in the case of dual-redundant control units) fails. Each plugin module 29A-C has a suitable mini-controller 39. In normal operation, the main control unit 27 communicates the role and desired behavior to the plugin modules 29A-C. If the main control unit 27 fails as determined by a loss of communication with both redundant control units 27, 37 (or the single main control unit 27 if not redundant), the plugin modules 29A-C switch to an autonomous mode, acting as a stand-alone mini-control unit instead of just an I/O card. In this manner, the plugin modules 29A-C continue to read inputs (e.g. temperature/static pressure information) from inputs 21A-C, and operate their outputs 23A-C and 25A-C. This capability is similar to the mini-controller 39 in each plugin module 29A-C acting like a main controller 28.

In one embodiment, an additional level of backup is provided with failsafe (e.g., de-energize to trip) relays 50. Operation of such failsafe relays 50 are known in the art such that when all power fails, the failsafe relays 50 activate to a state that will allow equipment to operate in an emergency mode.

Desirably, the control system operates in a hierarchical redundancy that encompasses different levels of protection. For example, if the control system 20 has a standby control unit 37, failure in the control system 20 would first be resolved by switching to the standby operation using the standby control unit 37. If switching to the standby control unit 37 does not resolve the problem, the plugin modules 29A-C would switch to the autonomous mode. Finally, the failsafe relays 50 would operate as a final mode of operation.

Accordingly, the climate control system 20 is operated by receiving climate information from the climate control input devices 21A-C at the plugin modules 29A-C. The climate information is communicated from the plugin modules 29A-C to the main control unit 27. The main control unit 27 determines operating instructions for the climate output devices 23A-C and air inlets 25A-C based on the climate information. When it is detected that the main control unit is not operational, the control system switches to the standby control unit 37 if so equipped. The climate information is then communicated from the plugin modules 29A-C to the standby control unit 37. The standby control unit 37 determines operating instructions for the climate output devices 23A-C and air inlets 25A-C based on the climate information. When it is detected that the standby control unit is also not operational, the plugin modules 29A-C switch to an autonomous mode such that operating instructions for the climate output devices 23A-C and air inlets 25A-C are determined by the plugin modules 29A-C. When it is determined that the plugin modules 29A-C are not operational, the failsafe relays are used to control operation of the output devices 23A-C and air inlets 25A-C.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A method for operating a climate control system of an animal containment house, the method comprising:
   receiving climate information from a plurality of climate control input devices at at least one plugin module;
   communicating the climate information from the plugin module to a main control unit, wherein each of the at least one plugin modules is connected with the main control unit with a main control unit communication connection and the main control unit is powered by a main power supply and each of the at least one plugin modules is connected with the standby control unit with a standby control unit communication connection and the standby control unit is powered by a standby power supply;

determining operating instructions for a plurality of climate output devices and air inlets based on the climate information with the main control unit;

detecting that the main control unit is not operational;

switching the at least one plugin module to an autonomous mode after detecting that the main control unit is not operational such that operating instructions for the plurality of climate output devices and air inlets based on the climate information are determined by the at least one plugin module;

communicating the climate information from the plugin module to a standby control unit;

detecting that the standby control unit is not operational; and determining operating instructions for a plurality of climate output devices and air inlets based on the climate information with the standby control unit;

determining the at least one plugin module is not operational; and operating at least one failsafe relays that controls operation of the climate output devices and air inlets.

2. The method of claim 1 wherein the output devices comprise ventilation fans and heaters.

3. A method for operating a climate control system of an animal containment house, the method comprising:

receiving climate information from a plurality of climate control input devices at at least one plugin module;

communicating the climate information from the plugin module to a main control unit, wherein each of the at least one plugin modules is connected with the main control unit with a main control unit communication connection and the main control unit is powered by a main power supply and each of the at least one plugin modules is connected with the standby control unit with a standby control unit communication connection and the standby control unit is powered by a standby power supply;

determining operating instructions for a plurality of climate output devices and air inlets based on the climate information with the main control unit;

detecting that the main control unit is not operational;

switching the at least one plugin module to an autonomous mode after detecting that the main control unit is not operational such that operating instructions for the plurality of climate output devices and air inlets based on the climate information are determined by the at least one plugin module;

communicating the climate information from the plugin module to a standby control unit; and determining operating instructions for a plurality of climate output devices and air inlets based on the climate information with the standby control unit, wherein the climate information is received from input devices comprising temperature and static pressure probes and the information is received for different portions of the animal house.

4. The method of claim 3 wherein the output devices comprise ventilation fans and heaters.

* * * * *